United States Patent
Padgett et al.

(10) Patent No.: US 6,895,235 B2
(45) Date of Patent: May 17, 2005

(54) ADAPTIVE LOAD AND COVERAGE MANAGEMENT SYSTEM AND METHOD

(75) Inventors: Jay Padgett, Middletown, NJ (US); Hisato Iwai, Tokyo (JP)

(73) Assignees: Telcordia Technologies, Inc., Piscataway, NJ (US); Toyota Motor Corporation, Aichi (JP)

(*) Notice: Subject to any disclaimer, the term of this patent is extended or adjusted under 35 U.S.C. 154(b) by 424 days.

(21) Appl. No.: 10/062,694

(22) Filed: Jan. 31, 2002

(65) Prior Publication Data

US 2002/0183039 A1 Dec. 5, 2002

Related U.S. Application Data

(60) Provisional application No. 60/295,550, filed on Jun. 5, 2001.

(51) Int. Cl.[7] .............................................. H04M 11/00
(52) U.S. Cl. .................. 455/406; 455/408; 379/114.06; 379/114.07; 379/114.08; 379/114.09
(58) Field of Search ................................. 455/405–410; 379/111, 112.01, 114.01, 114.06, 133–134

(56) References Cited

U.S. PATENT DOCUMENTS

| | | | | |
|---|---|---|---|---|
| 5,794,140 A | * | 8/1998 | Sawyer | 455/408 |
| 5,886,988 A | * | 3/1999 | Yun et al. | 370/329 |
| 6,295,453 B1 | * | 9/2001 | Desgagne et al. | 455/448 |
| 6,556,817 B1 | * | 4/2003 | Souissi et al. | 455/406 |

OTHER PUBLICATIONS

R.H. Frenkel, et al., "The Infostations Challenge: Balancing Cost and Ubiquity in Delivering Wireless Data," IEEE Pers. Commun.Mag., pp. 66–71, Apr. 2000.

* cited by examiner

*Primary Examiner*—Duc Nguyen
(74) *Attorney, Agent, or Firm*—Joseph Giordano; James W. Falk

(57) ABSTRACT

Methods and systems are provided for use in a wireless network that includes a base station and a mobile station. Service may be provided by the base station to the mobile station based on the traffic load on the network. When a request for a service is received at the base station, the cost of the service is determined. The request is granted if the determined cost is less than or equal to a threshold that is responsive to a load on the network.

4 Claims, 3 Drawing Sheets

ADAPTIVE LOAD AND COVERAGE MANAGEMENT SYSTEM AND METHOD

CROSS REFERENCE TO RELATED APPLICATION

This application claims the benefit of U.S. Provisional No. 60/295,550, filed Jun. 5, 2001, the contents of which are herein incorporated by reference.

BACKGROUND OF THE INVENTION

The present invention relates generally to wireless communication networks, and more particularly, to systems and methods for adapting the capacity or maximum throughput of a wireless network based on a load on the network.

A wireless network generally includes a group of base stations interconnected by transmission circuits, switching elements, and mobile terminals that provide service to nomadic users. As an example, FIG. 1 illustrates a simplified wireless network 100 that includes base stations 105–109, mobile terminals 110–116, and a switching element 130. The nominal coverage area of each base station 105–109 is often referred to as a cell. For example, cell 117 represents the nominal coverage area of base station 105, cell 118 represents the nominal coverage area of base station 106, and so on. Communication between base stations 105–109 and mobile terminals 110–116 takes place over the air interface, which is a radio link with a specified set of parameters.

Two important characteristics of a wireless network are capacity and coverage. Capacity may be defined as the maximum throughput (in bits per second) per base station. Coverage may be defined as the fraction of the nominal service area or cell over which service can be obtained.

Technology has made it increasingly important for base stations and mobile terminals to be able to communicate at relatively high rates. For example, the rates supported by third-generation (3G) cellular and personal communications systems greatly improve on the data transfer capabilities of second-generation systems. These rates, however, will not support the high speed network connectivity to which users are becoming accustomed as landline network technology evolves. Moreover, even the use of these rates will tax the capacity of a 3G cell. In the long term, there is a need for another solution to provide high speed wireless networking to support data-rate-intensive communications, such as multimedia applications and large file transfers.

To meet the demand for higher data rates, wireless networks need to maximize their capacity or throughput. Traditional public wireless networks are typically designed to provide uniform coverage over the entire area of the cell with a fixed upper limit on total data throughput. By relaxing the uniform coverage constraint, it is possible to increase the capacity of the network.

Many modern digital wireless air interfaces have the capability to adjust the transmit power and/or bit rate on a given link so that the transmitted energy per bit, denoted Ebt (joules per bit) is the minimum necessary to support the link. The greater the distance between the base and the mobile, the higher the required Ebt. If the total maximum base station transmit power is P (watts) and the average required energy per transmitted bit, for all mobiles served by the base station, is Eavg (joules per bit), the total throughput for the base station is R=P/Eavg (bits per second). Since P is typically fixed, the total throughput is maximized by minimizing Eavg. Serving mobiles far away from the base station greatly increases Eavg and therefore reduces the throughput R. By restricting service to mobiles near the base, the throughput can be increased at the expense of coverage. An inherent tradeoff therefore exists between capacity and coverage.

From the perspective of throughput, the Ebt required to serve a given mobile represents the system resource cost of serving that mobile. If Pm is the transmit power allocated to that mobile and Rm is the rate of the transmission to that mobile, in bits per second, then Ebt=Pm/Rm. The required Ebt therefore can be realized by allocating different power levels to different mobiles (dividing the total power among all served mobiles), or by serving different mobiles sequentially in time using the same total power but different bit rates, or by a combination of power control and rate control (adaptive rate modulation). Referring again to FIG. 1, mobile terminal 116, which is near base station 109, may have a low Ebt and therefore may communicate with the base station 109 at a relatively low cost, whereas mobile terminal 114, which is away from base station 109, may communicate with the base station 109 at a high cost. One known method for increasing the average throughput or total capacity of the base station is to selectively exclude or deny service to high-cost mobiles and serve only those mobiles with Ebt below some threshold value. However, this is only productive in terms of increasing throughput if the total demand for service (offered load) exceeds the level that can be supported by the base station.

A known method relaxes the uniform coverage constraint to increase capacity. By limiting coverage to a small area around each base station, the mobile terminals being served may have a lower required Ebt, thus permitting a greater throughput. This is the basis of the Infostations concept, described in R. H. Frenkiel, et al., "The Infostations Challenge: Balancing Cost and Ubiquity in Delivering Wireless Data," *IEEE Pers. Commun. Mag.*, pp. 66–71, April 2000. Frenkiel proposes combining the downlink-only coverage zones surrounding base stations. The modulation rates in this approach would adapt within limits to maximize the data transmission rate, based on the mobile's required Ebt. One limitation of this approach is potential wasted air space or unused system resources when few mobiles are in the coverage zones.

While the above-described method and the methods of existing wireless networks focus on maximizing capacity subject to one or more constraints, the capacity itself is static, in that these methods are not responsive to load presented on the network. Instead, these methods share the available capacity among active users that are distributed over a fixed coverage area in some fashion. This static approach does not allow the inherent capacity/coverage tradeoff to be exploited in an adaptive manner as the load or demand for service changes.

SUMMARY OF THE INVENTION

To overcome the above and other disadvantages of the prior art, methods and systems are provided for use in a wireless network that includes a base station and a mobile station. When a request for a service is received at the base station, the cost of the service is determined. The request is granted if the determined cost is less than or equal to a threshold that is responsive to a load on the network.

The summary of the invention and the following description for carrying out one mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts.

Figure 1:
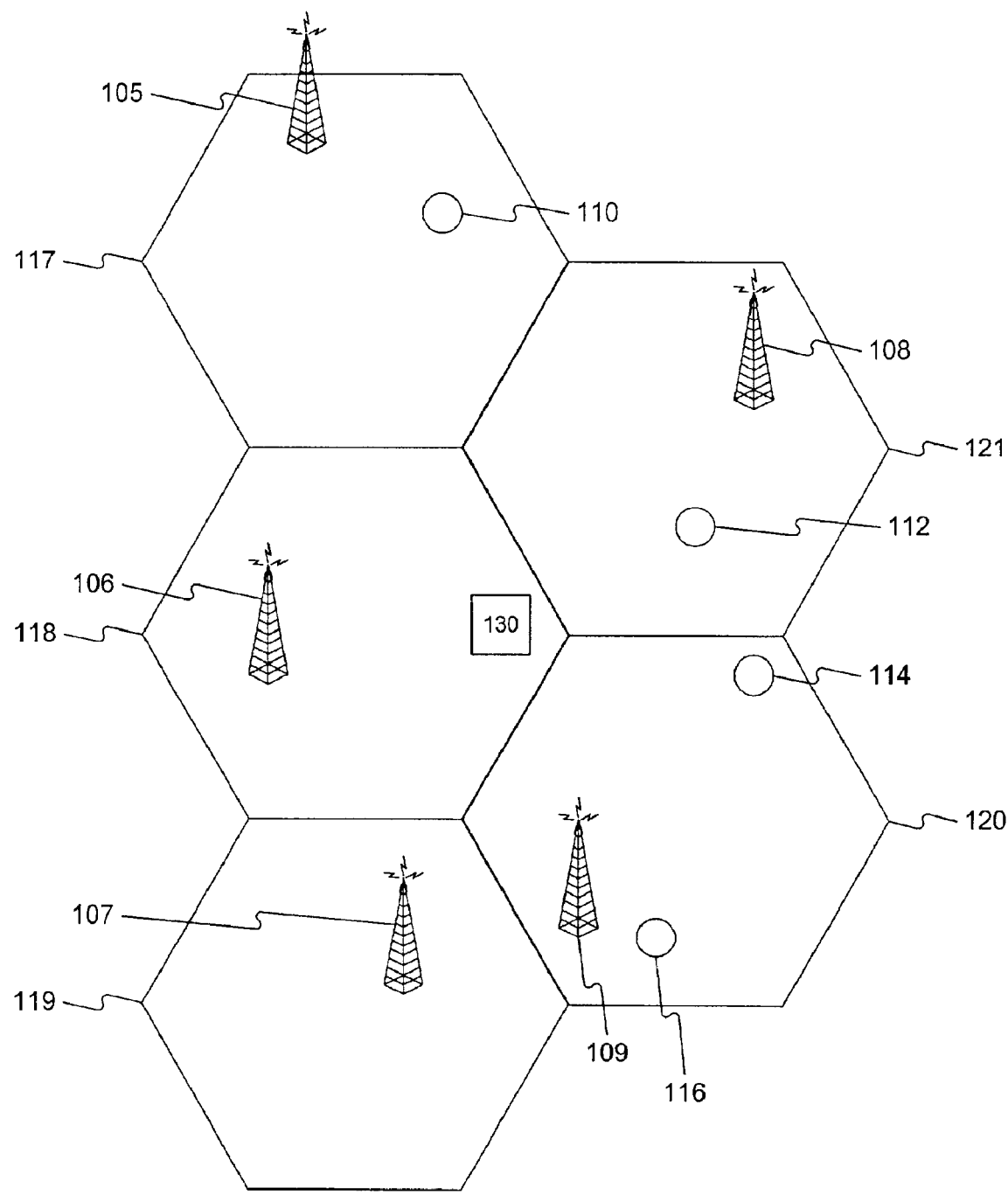
FIG. 1 illustrates a wireless network, in accordance with methods and systems consistent with the present invention.

Systems and methods are provided for use in a wireless network and for adaptively managing the tradeoff between capacity and coverage based on the traffic load on the network. In one embodiment, the methods are applied to a high-speed downlink (HSD) which provides high-rate transmissions from the base station to the mobiles. In this embodiment, transmissions to different mobiles occur serially in successive time intervals, so that at any given time, the base station is transmitting to a single mobile. In response to a service request generated by an application, a mobile in the network monitors the HSD frequency (or frequencies) to determine the base station which can deliver the highest signal-to-interference plus noise ratio (SINR). Each HSD base station may periodically send an information field that includes a unique identifier (i.e., a beacon). After selecting the strongest base station, the mobile sends an HSD service request on the uplink of the underlying wireless system. Embedded in that request may be (1) the maximum data rate the mobile can receive based on its SINR measurements on the HSD frequency; (2) the identifier of the selected HSD base station; and (3) information about the message length and service class. If the base station grants the mobile's request, a control process at the HSD base station adds the request to its queue of granted requests. When the request reaches the front of the queue, the base station may transmit the HSD packet at the highest rate the mobile can reliably receive based on its SINR. Since the base station transmit power is fixed, the highest possible rate equates to the lowest possible cost or required transmitted energy per bit. The base station may determine whether to grant the mobile's request, manage the control process for adding the request to the queue, and/or allocate resources for transmitting the service based on the traffic load on the network. The system in the base station that performs the functions of determining whether to grant the mobile's request, managing the control process for adding the request to the queue, and/or allocating resources for transmitting the service is referred to as an adaptive load and coverage management (ALCM) system. The ALCM system may be included, for example, at each base station 105–109 shown in FIG. 1. Alternatively, in addition to the ALCM system at each base station or separately, an ALCM system may be included at a centralized location, such as switching element 130.

Figure 2:
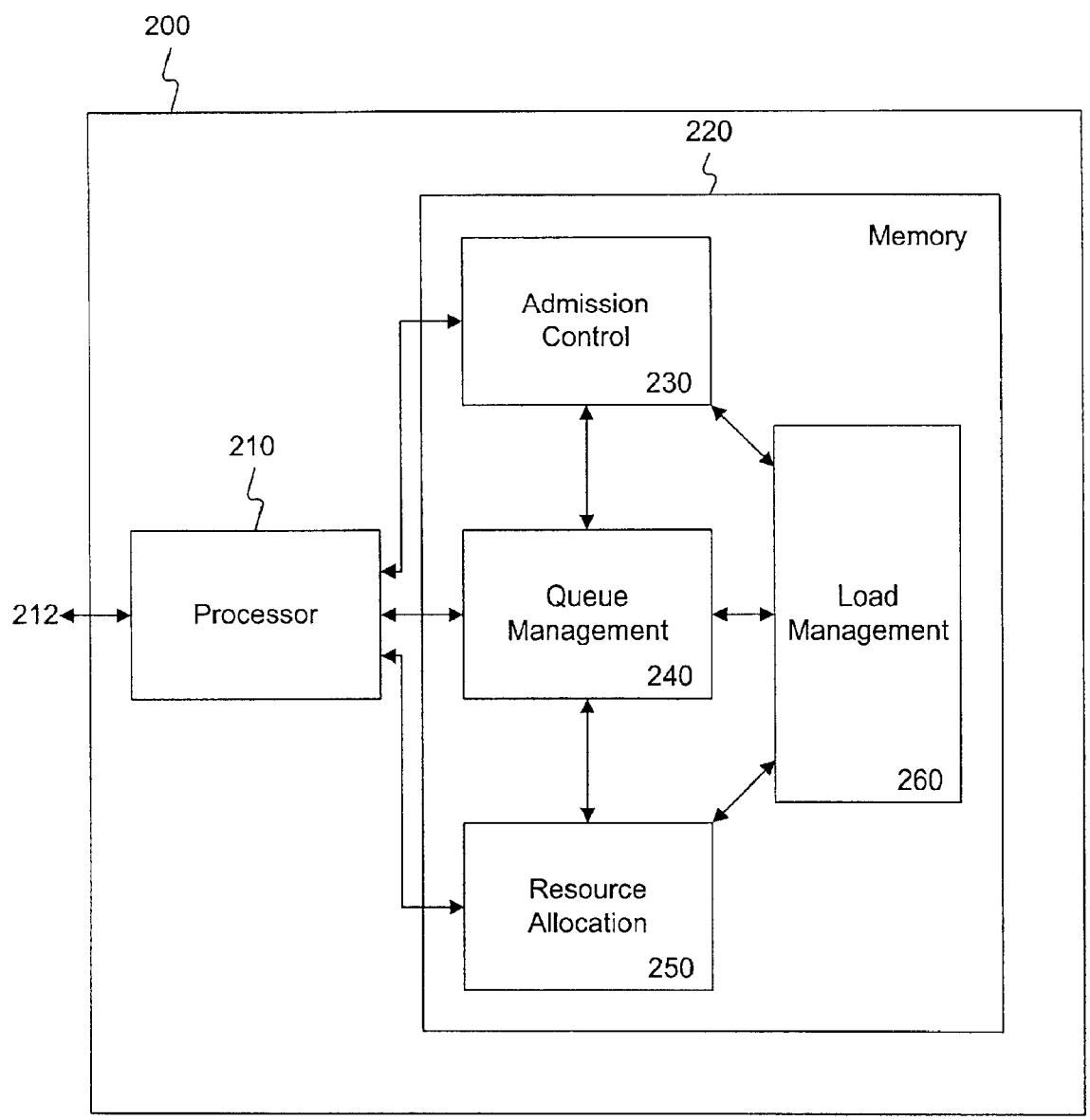
FIG. 2 is a block diagram of an adaptive load and coverage management (ALCM) system, in accordance with methods and systems consistent with the present invention.

FIG. 2 is a block diagram of an ALCM system 200, in accordance with methods and systems consistent with the present invention. ALCM system 200 may include a processor 210 and a memory 220. Processor 210 may receive requests for service from mobile terminals via port 212 and may also provide instructions to the base station (or switching element) for providing services via port 212. Processor 210 also may determine whether to grant a request from a mobile terminal, add a request to a queue of granted requests, and/or allocate resources to provide the service requested based on instructions stored in memory 220.

Memory 220 may include an admission control module 230, a queue management module 240, a resource allocation module 250, and a load management module 260. When incoming requests are received by processor 210 via port 212, processor 210 determines whether to grant the request based on instructions included in admission control module 230. For example, admission control module 230 may include admission criteria, such as message length (number of bits), service class of the request, the rate at which the request can be served, the number of previous attempts made by the requesting mobile, and/or required resources, such as the total amount of energy required to transmit the message.

If a request is granted, processor 210 initiates a process to add the request to a queue of granted requests, based on instructions included in queue management module 240. Processor 210 and/or queue management module 240 may include, for example, multiple queues for different service classes.

Queue management module 240 may include instructions allowing processor 210 to reorder messages waiting in one or more queues. The reordering may be based on, for example resource requirements, service priority delay limits, message length, transmit time, or other criteria. Queue management module 240 also provides information about what request will be served next. This may be based on the position of the request in the queue, resource requirements, class of service requested, or message length. When a request is indicated to be next in line for service, processor 210 prepares the request to be serviced.

For example, processor 210 may instruct the base station to allocate resources for servicing the request based on instructions included in resource allocation module 250. Resource allocation module 250 may include instructions to determine how bandwidth, power, and/or transmission time are used to transmit each message. The base station may then transmit the message to the mobile terminal.

Admission control module 230, queue management module 240, and resource allocation module 250 may be jointly managed based on load management module 260. For example, processor 210 may grant a request if the resource requirement for the service requested falls below a certain prescribed threshold. In this case, load management module 260 may jointly manage both admission control module 230 and resource allocation module 250.

Load management module 260 may include a medium access control (MAC) layer entity or process that controls policies or criteria used by the other three modules. Further, load management module 260 may monitor the activities of the admission control module 230, queue management module 240, and resource allocation module 250.

ALCM 200 may be configured manually or automatically. For example, a network operator may manually configure one or more of load management module 260, admission control module 230, queue management module 240, or resource allocation module 250 in memory 220.

Alternatively, a network control process may configure one or more of load management module 260, admission control module 230, queue management module 240, or resource allocation module 250 based on the time of day, the load on adjacent cells, or other criteria. ALCM system 200 may also collect data on received requests, served requests, denied requests, error transmissions, and other operating measures and conditions useful for monitoring and managing the network. ALCM system 200 may forward this collected data to a centralized control process located in switching element 130 shown in FIG. 1 for use in managing the network. In turn, the centralized control process may then alter the configuration of one or more of load management module 260, admission control module 230, queue management module 240, or resource allocation module 250 in memory 220 to permit more centralized control, allowing capacity to be borrowed from one cell and applied to another nearby cell. This may be accomplished, for example, by reducing the maximum transit power of one cell and/or increasing the maximum transit power of the other cell.

Admission control module 230, queue management module 240, resource allocation module 250, and load management module 260 may each be implemented using hardware specifically constructed for performing various processes and operations described herein or may include a general purpose computer or computing platform selectively activated or reconfigured by program code to provide the necessary functionality.

Admission control module 230, queue management module 240, resource allocation module 250, and load management module 260 may each include policies and/or criteria for managing the traffic load on the network. In a default mode, processor 210 may grant and queue all requests received. In this mode, the load may exceed the transmission capacity of the base station. The queue may grow until the buffers associated with the queue are exhausted, at which time service may be denied until buffer space becomes available. The capacity of the default mode is the same, regardless of the load on the network.

Alternatively, capacity of the network may be altered based on the load on the network. For example, consideration of the load on the network may affect admission control, queue management, or resource allocation processes, or any combination thereof. Exemplary configurations of admission control module 230, queue management module 240, and resource allocation module 250 are described below.

Admission Control Module

Admission control or the granting of requests may be based, in part, on the traffic load on the network. For example, admission control may include a cost threshold, wherein if the cost to provide the requested service is below the cost threshold, the request is granted. The cost to provide the requested service may be determined in terms of factors such as transmit power, data rate, and bandwidth, that relate to the required transmitted energy per bit.

Figure 3:
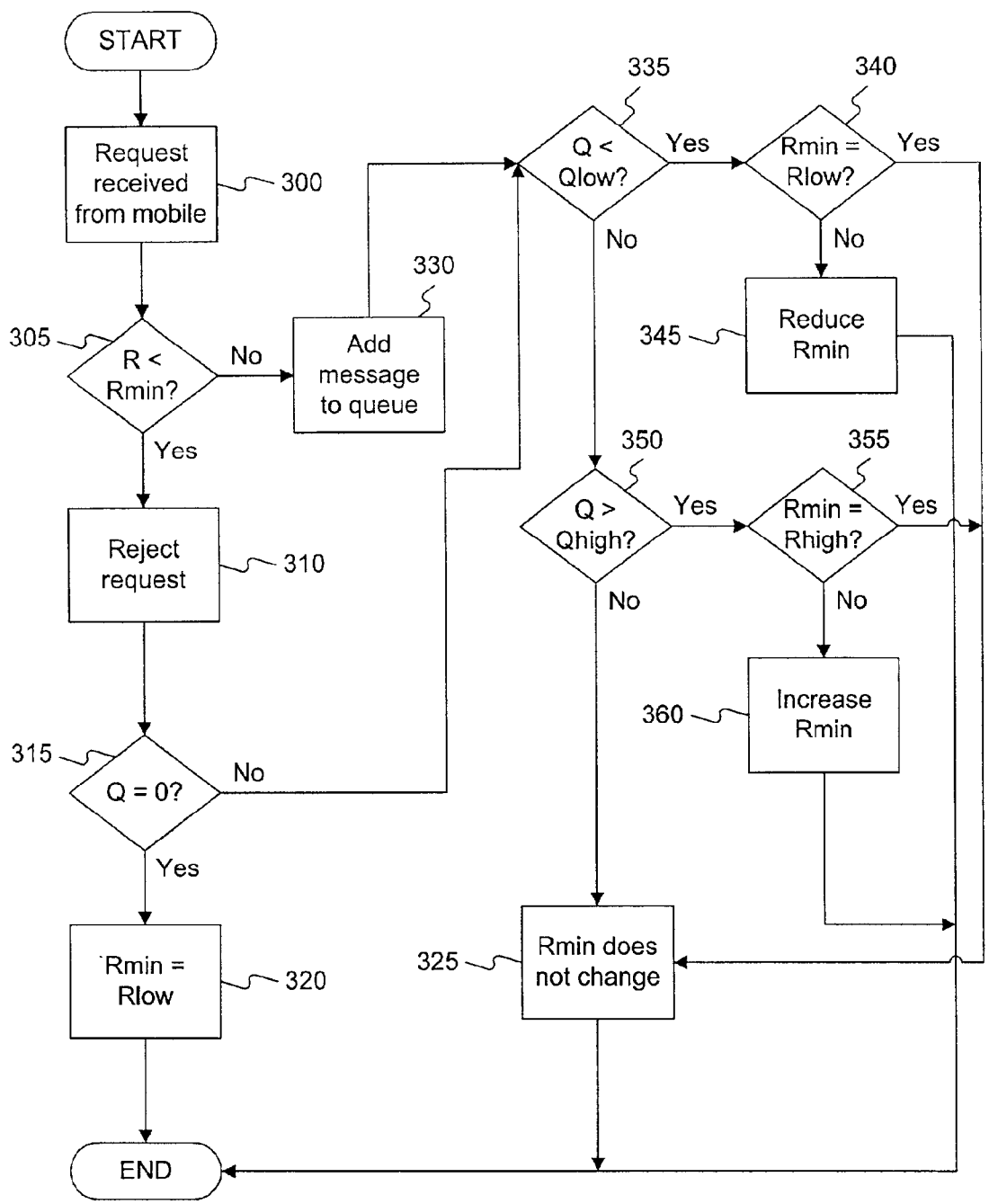
FIG. 3 illustrates a flow chart of an exemplary admission control module configuration, in accordance with methods and systems consistent with the present invention.

FIG. 3 illustrates an admission control method in further detail using a cost based on the requested data rate, which is inversely proportional to the transmitted energy per bit. Admission control module 230 receives a request from a mobile 110–116 (step 300). The request may include a maximum data rate as calculated by the mobile based on the SINR. Alternatively, admission control module 230 may calculate the requested rate of service based on an SINR included in the request. Admission control module 230 may then determine if the requested data rate is less than a first threshold Rmin (step 305). The initial value of Rmin may be set by a network administrator or by some other criteria based on the configuration of the network. If the requested rate is less than Rmin, admission control module 230 may reject the request (step 310). After the request is rejected, admission control module 230 and load management module 260 may adjust the threshold Rmin. The adjustment may depend on the state of the queue. Specifically, admission control module 230 may determine if the queue length is zero or the queue is empty (step 315). If the queue is empty, and Rmin is greater than a low threshold value Rlow, the admission control module 230 and/or load management algorithm 260 may reduce the value of Rmin to Rlow, thus relaxing the admission requirements (step 320). If, in step 315, admission control module 230 determines that the queue is not empty (and the pending request has been rejected and does not affect the queue length), then Rmin may be increased or reduced, or may remain the same, depending on the queue length as explained below (step 335).

Returning to step 305, if the rate of the mobile's service request is greater than Rmin, then admission control module 230 may add the message to the queue and increment Q, the length of the queue, by 1 (step 330). Admission control module 230 then may determine if the length of the queue falls below a first threshold Qlow (step 335). If so, admission control module 230 may determine if Rmin is equal to a low threshold value Rlow (step 340). If Rmin is greater than Rlow, admission control module 230 may reduce Rmin, relaxing the admission requirements (step 345). If Rmin is already at the Rlow value, admission control module 230 does not change Rmin (step 325). If Q is determined to be above Qlow in step 335, admission control module 230 determines if Q is greater than a high threshold value Qhigh (step 350). If Q is greater than Qhigh, admission control module 230 determines if Rmin is equal to a second threshold Rhigh (step 355). If Rmin is not equal to Rhigh, admission control module 230 increases Rmin to make admission more restrictive (step 360). If Rmin is equal to Rhigh, admission control module 230 does not change Rmin (step 325). Whether Rmin remains the same or is adjusted to make admission more restrictive or relaxed, admission control is complete until another request is received.

In one exemplary network, the above-described method may be implemented as follows: The possible values for Rmin may be $3/16$, $5/16$, $1/2$, $3/4$, 1, 2, 3, 4, 5, and 6 times the transmission bandwidth. The values for Qlow and Qhigh may be set at 10 and 20 messages, respectively. When admission requirements are relaxed, as in step 345, Rmin may be decreased from, for example, 1 to $3/4$. Similarly, when admission requirements are restricted, as in step 360, Rmin may be increased from, to for example, 1 to 2. Although these values are merely exemplary, the results based on this implementation show that full uniform coverage can be provided at a capacity of about 0.45 bits per second per Hz (bps/Hz). If the offered load increases above this level, mobiles near the cell edge are often denied service, but the total throughput increases. For example, with an offered load of 4 bps/Hz, the carried load is about 0.8 bps/Hz.

Although the above embodiment of admission control module 230 utilizes a cost based on the requested data rate, it should be understood that any cost may be used to readjust the threshold based on the traffic load on the network. Generally, the cost may be viewed as a high threshold; i.e., requests may be admitted if the associated cost of the request is less than the threshold value. To relax admission requirements, the threshold may be increased to admit more costly requests. To restrict admission requirements, the threshold may be decreased.

Queue Management Module

To more aggressively manage the tradeoff between coverage and capacity, a queue management module configuration can also be added to ALCM system 200. With this configuration, queue management module 240 may include a maximum number of granted requests awaiting service in the queue or Qmax. If the queue is not full (i.e., the length of the queue, Q, is less than Qmax) when admission control algorithm 230 grants a request, that request may be added to the end of the queue. If the queue is full (i.e., Q equals Qmax), queue management module 240 may determine a cost associated with providing the service requested. Queue management module 240 may then compare this determined cost to the costs associated with each of the messages already in the queue. If at least one of the queued requests has a higher cost than the newly-granted request, the higher cost request may be removed from the queue and the new request may be added to the end of the queue. Alternative queue management module configurations are also possible, such as re-ordering the queue to serve the least-costly requests first.

To implement the above-described method in a network having an admission control algorithm implemented as described above, the value for Qmax may be set at 20. Again, although these values are merely exemplary, the results based on this implementation show that it effectively shrinks the coverage area as demand increases. Full uniform coverage is provided for an offered load of roughly 0.45 bps/Hz. As offered load increases above that value, the effective cell boundary is reduced and throughput is increased because mobiles that are costly to serve are denied service. For example, at an offered load of 4 bps/Hz, the throughput is about 1.6 bps/Hz. Service is available only in the inner 40% of the original cell area.

Resource Allocation Module

In this embodiment, one base station resource is transmit airtime, since the same transmit power is used for each served mobile in a sequence. Resource allocation module 250 may govern the manner in which transmit airtime is allocated to each mobile. One exemplary method is to allocate a fixed time interval to each mobile which is granted service. Another exemplary method allocates the time required to transmit some fixed number of bits to each mobile; the exact amount of time allocated to each mobile would depend on the bit rate at which that mobile could be served. Yet another exemplary method is to allocate the time required to transmit a full message or packet to each served mobile. In that case, the allocated time would depend on the length of the message or packet and the bit rate at which the mobile could be served.

The systems and methods described herein may be used under a broad set of conditions. They apply equally well whether a single HSD frequency is used in every cell or the available bandwidth is divided into several sub-bands assigned to base stations in a reuse pattern. While a 3- or 4-frequency arrangement may give a slight capacity advantage for full coverage, a single frequency may be preferable at high loads. Moreover, a single-frequency network may be much simpler to design and grow as the subscriber base increases.

In yet another embodiment, an HSD base station may use a separate frequency from the underlying wireless network, but be installed on the same support structure such as a tower or building roof as the 3G base station. HSD power output could then be adjusted so that the maximum coverage is consistent with that of the underlying wireless network. Ideally, the HSD base station base station and its associated control processor would only need to be physically installed and connected to the network. Radio resource and traffic load management may be automatic, and there may be no need for extensive radio network engineering, such as frequency planning. Finally, the MAC-layer control structure may be as decentralized as possible to minimize the need for high-speed control links, and also to make the network more robust.

While the above description has focused on application of ALCM techniques to HSD systems, those techniques can also be applied to systems and methods providing duplex transmission. Third generation systems with their extensive multi-rate capabilities may also be good candidates. Further, systems and methods consistent with the present invention may be applied to total cell capacity or to a portion of the cell capacity. For example, a portion of the capacity may be available on a priority basis for full-coverage real-time traffic, such as speech, while the remaining capacity would be subject to ALCM.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for use in a wireless network that includes a base station, the method comprising the steps of:

receiving, at the base station, a request for a service;

determining a cost to provide the service; and granting the request when the determined cost is less than or equal to a threshold that is responsive to a load on the network, the step of granting the request including the step of adjusting the threshold after the request is granted or rejected and the step of adjusting the threshold including:

determining a number of granted requests waiting to be served;

increasing the threshold if the number of granted requests waiting to be served is less than a first value; and decreasing the threshold if the number of granted requests waiting to be served is greater than a second value.

2. The method of claim 1, wherein the granted requests waiting to be served are stored in a queue having a front and an end and the step of granting the request includes:

determining a length of the queue;

adding the received request to the end of the queue if the determined length is less than a predetermined length;

determining a cost to perform the respective granted requests in the queue; and removing one of the granted requests in the queue and adding the received request to the end of the queue, if the determined length is equal to the predetermined length and the determined cost to provide the service is less than at least one of the costs to perform the granted requests in the queue.

3. A system comprising:

means for receiving a request for service in a wireless network;

means for determining a cost to provide the service; and means for granting the request when the determined cost is less than or equal to a threshold that is responsive to a load on the network, said means for granting including means for determining a number of requests waiting to be served; and means for increasing the threshold if the number of granted requests waiting to be served is less than a first value and for decreasing the threshold if the number of requests waiting to be served is greater than a second value.

4. The system of claim 3 wherein granted requests waiting to be served are stored in a queue having a front and an end, said system including means for determining a length of the queue;

means for determining a cost to perform the respective granted requests in the queue; and means for adding the received request to the end of the queue if the determined length is less than a predetermined length and for removing one of the granted requests in the queue and adding the received requests to the end of the queue, if the determined length is equal to the predetermined length and the determined cost to provide the service is less than at least one of the costs to perform the granted requests in the queue.

* * * * *

UNITED STATES PATENT AND TRADEMARK OFFICE
CERTIFICATE OF CORRECTION

| | |
|---|---|
| PATENT NO. | : 6,895,235 B2 |
| APPLICATION NO. | : 10/062694 |
| DATED | : May 17, 2005 |
| INVENTOR(S) | : Padgett et al. |

It is certified that error appears in the above-identified patent and that said Letters Patent is hereby corrected as shown below:

On the Title Page, Item (56), under "OTHER PUBLICATIONS", in Column 2, Line 1, delete "Frenkel," and insert -- Frenkiel, --, therefor.

In the Specification

In Column 3, Line 18, delete "DESCRIPTION" and insert -- DETAILED DESCRIPTION --, therefor.

In Column 4, Line 31, delete "in one" and insert -- in the one --, therefor.

In Column 4, Line 33, delete "example" and insert -- example, --, therefor.

In Column 4, Line 33, delete "priority" and insert -- priority, --, therefor.

In Column 4, Line 36, delete "served" and insert -- serviced --, therefor.

In Column 6, Line 11, delete "algorithm 260" and insert -- module 260 --, therefor.

In Column 6, Line 50, delete "to for" and insert -- for --, therefor.

In Column 7, Line 9, delete "algorithm 230" and insert -- module 230 --, therefor.

In the Claims

In Column 9, Line 6, in Claim 4, delete "claim 3" and insert -- claim 3, --, therefor.

In Column 9, Line 8, in Claim 4, delete "including" and insert -- including: --, therefor.

Signed and Sealed this
Eighteenth Day of November, 2014

Michelle K. Lee
*Deputy Director of the United States Patent and Trademark Office*